United States Patent
Matsui et al.

(10) Patent No.: US 9,963,634 B2
(45) Date of Patent: May 8, 2018

(54) SYNTHETIC QUARTZ GLASS SUBSTRATE POLISHING SLURRY AND MANUFACTURE OF SYNTHETIC QUARTZ GLASS SUBSTRATE USING THE SAME

(71) Applicant: SHIN-ETSU CHEMICAL CO., LTD., Tokyo (JP)

(72) Inventors: Harunobu Matsui, Joetsu (JP); Daijitsu Harada, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 506 days.

(21) Appl. No.: 13/676,213

(22) Filed: Nov. 14, 2012

(65) Prior Publication Data

US 2013/0130596 A1    May 23, 2013

(30) Foreign Application Priority Data

Nov. 18, 2011   (JP) .................................. 2011-252633

(51) Int. Cl.
| | |
|---|---|
| C09K 13/00 | (2006.01) |
| B24B 7/24 | (2006.01) |
| C09K 13/02 | (2006.01) |
| C03C 19/00 | (2006.01) |
| C09G 1/02 | (2006.01) |

(52) U.S. Cl.
CPC ............. *C09K 13/00* (2013.01); *B24B 7/241* (2013.01); *C03C 19/00* (2013.01); *C09G 1/02* (2013.01); *C09K 13/02* (2013.01)

(58) Field of Classification Search
CPC ......... B24B 37/044; B24B 1/00; B24B 7/241; C09G 1/02; C03C 19/00; C09K 13/00; C09K 13/02
USPC .................................................... 451/41, 36
See application file for complete search history.

(56) References Cited

U.S. PATENT DOCUMENTS

| | | | | |
|---|---|---|---|---|
| 6,679,761 | B1 * | 1/2004 | Sunahara et al. | 451/41 |
| 8,617,275 | B2 * | 12/2013 | Hoshi et al. | 51/309 |
| 2002/0039875 | A1 | 4/2002 | Kobayashi et al. | |
| 2007/0207180 | A1 * | 9/2007 | Tanihara et al. | 424/423 |
| 2007/0287362 | A1 * | 12/2007 | Takenouchi | 451/28 |
| 2008/0023859 | A1 * | 1/2008 | Miura et al. | 264/4.1 |
| 2009/0203215 | A1 * | 8/2009 | Yoshikawa et al. | 438/693 |
| 2010/0243950 | A1 | 9/2010 | Harada et al. | |

FOREIGN PATENT DOCUMENTS

| | | | |
|---|---|---|---|
| EP | 0640647 A2 * | 3/1995 | ........... A61K 9/0019 |
| EP | 1235261 A1 | 8/2002 | |
| EP | 2412687 A1 | 2/2012 | |
| JP | 64-040267 A | 2/1989 | |
| JP | 2009-102488 A | 5/2009 | |
| JP | 2009-131947 A | 6/2009 | |
| WO | 2011/064734 A1 | 6/2011 | |

OTHER PUBLICATIONS

D. W. Urry, "Free Energy Transduction in Polypeptides and Proteins based on Inverse Temperature Transitions", Prog. Biophys. molec. Biol., vol. 57, pp. 23-57, 1992.
Extended European Search Report dated Feb. 28, 2013, issued in corresponding European Patent Application No. 12192828.7.
D. W. Urray et al., "Free Energy Transduction in Polypeptides and Proteins Based on Inverse Temperature Transitions", Progress in Biophysics and Molecular Biology, vol. 57, 1992, pp. 23-57, dated Feb. 28, 2013.

* cited by examiner

*Primary Examiner* — Christopher M Koehler
*Assistant Examiner* — Joel Crandall
(74) *Attorney, Agent, or Firm* — Westerman, Hattori, Daniels & Adrian, LLP

(57) ABSTRACT

In polishing of synthetic quartz glass substrates, a polishing slurry is used comprising (i) an oligopeptide comprising recurring units of pentapeptide: -[valine-proline-glycine-valine-glycine]- and having a molecular weight of 800-150,000 or a copolymer of the pentapeptide with another monomer, and (ii) a colloidal solution.

2 Claims, No Drawings

SYNTHETIC QUARTZ GLASS SUBSTRATE POLISHING SLURRY AND MANUFACTURE OF SYNTHETIC QUARTZ GLASS SUBSTRATE USING THE SAME

CROSS-REFERENCE TO RELATED APPLICATION

This non-provisional application claims priority under 35 U.S.C. § 119(a) on Patent Application No. 2011-252633 filed in Japan on Nov. 18, 2011, the entire contents of which are hereby incorporated by reference.

TECHNICAL FIELD

This invention relates to a polishing slurry for use in polishing of synthetic quartz glass substrates useful as the microelectronic material for the advanced application, and a method of manufacturing synthetic quartz glass substrates using the polishing slurry.

BACKGROUND ART

With respect to the quality of synthetic quartz glass substrates, further improvements in defect size, defect density, and surface roughness on substrates are needed to meet the demand for the size reduction of photolithography pattern. In the IC and related fields, for example, the trend toward pattern size reduction and capacity enlargement poses severe specifications with respect to defects on substrates.

Under the circumstances, it is desirable for the substrate surface to minimize defect size and reduce defect density, and even to be defect-free. Efforts are made to attain the goal, for example, by adding additives to polishing slurries to improve the dispersion state. JP-A S64-40267 discloses precision polishing of glass substrates using colloidal silica. When the polished glass surface is inspected for defects using a high-sensitivity flaw detector, microscopic raised/recessed defects are observed. This method is still unsatisfactory as the microscopic defect control.

JP-A 2009-131947 discloses a method of preventing the surface of a magnetic disk substrate from being scratched. A water-soluble polymer such as a (meth)acrylic acid/sulfonic acid copolymer is added to a polishing slurry of silica (abrasive grains) to inhibit agglomeration of silica therein. Since the long molecular chain of the polymer like (meth) acrylic acid/sulfonic acid copolymer can be gradually cleaved by the polishing heat, the polishing slurry loses stability during the continuous polishing process, which is undesired from the aspect of polishing life.

The method of JP-A 2009-131947 suffers from economic and environmental problems. Since the polishing slurry fails to maintain its quality stable during circulating repetitive service, the polishing slurry must be replaced by a fresh one. It is difficult under certain polishing conditions to estimate the lifetime of the polymer in the slurry.

CITATION LIST

Patent Document 1: JP-A S64-40267
Patent Document 2: JP-A 2009-131947
Non-Patent Document 1: D. W. Urry et al., Prog. Biophys. Molec. Biol., 1992, 57, 23

DISCLOSURE OF INVENTION

An object of the invention is to provide a polishing slurry for use in polishing of synthetic quartz glass substrates that are useful in the fabrication of microelectronic devices such as photomasks, nanoimprint molds and magnetic disks, which polishing slurry is effective for inhibiting defect formation and has a prolonged polishing lifetime. Another object is to provide a method of manufacturing synthetic quartz glass substrates using the polishing slurry.

With respect to the mechanism that the polishing slurry degrades its performance, the inventors made research based on the following hypothesis. As the polishing heat generated during the polishing operation causes water in the polishing slurry to evaporate and diffuse into air, the slurry decreases its water concentration. This is true even when an organic solvent such as alcohol or glycol is added to the polishing slurry. A drop of water concentration means that the polishing slurry is concentrated so that abrasive grains in the slurry may fuse together or with glass fragments released from the surface of a glass substrate or workpiece, creating coarse particles which are foreign to the polishing action. It is believed that these coarse particles resulting from fusion will be adhered and fused to the glass surface by the polishing action and cause flaws to the glass surface. It is thus recognized important to control a drop of water concentration of the polishing slurry which is one cause for the growth of coarse particles, that is, to mitigate the impact on the polishing slurry of the polishing heat that causes a concentration change.

The polishing process using a polishing slurry having a polymer like (meth)acrylic acid/sulfonic acid copolymer added thereto as described in Patent Document 2 may be somewhat effective in suppressing a concentration change of the slurry because the polymer utilizes the polishing heat in that it undergoes hydrolysis reaction upon receipt of the polishing heat as reaction energy. However, the above effect is not expectable when the polymer approaches to the monomeric state as a result of its long chain alkyl being fully hydrolyzed. From this point of time, it is impossible to control the concentration of the polishing slurry, allowing abrasive grains to agglomerate, which can cause flaws and scratches to the substrate surface. Also, in the case of long-term polishing or polishing under severe conditions such as heavy polishing loads, a large amount of polishing heat is generated to accelerate the hydrolysis reaction of the polymer whereupon the polishing slurry seems ineffective. Even if the amount of the polymer added is increased, there is a limit. If the polymer concentration is too high, polymer molecules interact to induce a gelation or undesirable phenomenon whereupon the polishing slurry becomes no longer effective.

The inventors have found that when an oligopeptide or peptide chain-containing copolymer which has temperature response and changes its molecular structure at a certain temperature is added to a polishing slurry containing a colloidal solution such as colloidal silica, any drop of water concentration of the polishing slurry and hence, any change of polishing slurry concentration can be inhibited since the oligopeptide or copolymer absorbs the polishing heat via structural change. The addition of the oligopeptide or copolymer is effective for mitigating fusion of abrasive grains together as a result of concentration of the slurry and fusion of abrasive grains with glass fragments released from the surface of a glass substrate or workpiece, and for preventing formation of foreign particles which can cause defects and scratches to the substrate surface.

In one aspect, the invention provides a polishing slurry for synthetic quartz glass substrates, comprising (i) an oligopeptide comprising recurring units of pentapeptide: -[valine-proline-glycine-valine-glycine]- and having a molecular weight of 800 to 150,000 or a copolymer of the pentapeptide with another monomer copolymerizable therewith, and (ii) a colloidal solution.

Preferably component (i) comprises 2 to 20 recurring units of pentapeptide. Most often, the colloidal solution is a colloidal silica water dispersion. The polishing slurry is typically at pH 8 to 11. The polishing slurry may further comprise at least one member selected from the group consisting of alkali metal hydroxides, alkaline earth metal hydroxides, basic salts, organic amines, ammonia and ammonium salts.

In another aspect, the invention provides a method of manufacturing a synthetic quartz glass substrate through rough polishing and final polishing, wherein the final polishing step uses the polishing slurry defined above.

In a preferred embodiment, the polishing slurry is kept at a temperature below the phase transition temperature of said oligopeptide or copolymer and then fed to the final polishing step so that the oligopeptide or copolymer may absorb the polishing heat of the final polishing step.

Advantageous Effects of Invention

In the manufacture of synthetic quartz glass substrates which are typically used in the photolithography for the fabrication of microelectronic devices such as photomasks, nanoimprint molds and magnetic disks, the polishing slurry of the invention is effective for minimizing defects of a size detectable by a high-sensitivity flaw detector, on the substrate surface, and has a prolonged polishing lifetime. The polishing slurry is not only effective for manufacturing polished substrates of improved quality, but also advantageous from the aspects of environmental load and cost.

DESCRIPTION OF PREFERRED EMBODIMENTS

One embodiment of the invention is a polishing slurry for use in polishing of synthetic quartz glass substrates, comprising (i) an oligopeptide comprising recurring units of pentapeptide: -[valine-proline-glycine-valine-glycine]- and having a molecular weight of 800 to 150,000 or a copolymer of the pentapeptide with another monomer copolymerizable therewith, and (ii) a colloidal solution.

(i) Oligopeptide or Copolymer

The oligopeptide or copolymer used herein is a polymer or oligomer having a molecular weight of 800 to 150,000 and comprising recurring units of pentapeptide represented by the sequence: -[valine-proline-glycine-valine-glycine]- in its molecular structure. That is, the polymer or oligomer is represented by the sequence: -[Val-Pro-Gly-Val-Gly]$_n$- wherein n is the degree of polymerization or the number of recurring units. The sequence is simply referred to as VPGVG, hereinafter. It is noted that V, P, and G are symbols of amino acid, V stands for valine (Val), P for proline (Pro), and G for glycine (Gly).

The molecular weight is preferably in a range of 1,500 to 60,000. With too low a molecular weight, the molecule absorbs a correspondingly small amount of heat, failing to absorb the desired amount of polishing heat. Too high a molecular weight indicates too strong intermolecular interaction, resulting in agglomeration. It is noted that the molecular weight is measured by gel permeation chromatography (GPC) versus polystyrene standards using tetrahydrofuran solvent.

The oligopeptide having recurring units of VPGVG has temperature response in water and takes different structures above and below the phase transition temperature. Specifically, the oligopeptide turns hydrophilic below the transition temperature and hydrophobic above the transition temperature through a structural change of molecule. For example, synthetic poly-(VPGVG) has temperature response in water and undergoes reversible phase transition known as "inverse temperature transition" (ITT) (see Non-Patent Document 1). This reaction is reversible so that repetitive changes can be made by taking thermal energy into and out of the molecule. If this phenomenon is utilized, the polishing heat generated in the polishing step is consumed in large part by the structural change of the peptide. This is effective for preventing the polishing slurry from increasing its abrasive grain concentration as a result of the polishing slurry elevating its temperature and thus reducing its water concentration.

The number n of recurring units of pentapeptide VPGVG is preferably in a range of 2 to 20, more preferably 4 to 10, and even more preferably 4 to 8. If the number of recurring units is too large, the phase transition temperature may become a high temperature that the polishing heat generated in the polishing step fails to reach. For example, naturally occurring elastin which is a macro-molecule containing numerous recurring units of VPGVG (n=approx. 40 to 80) is known to undergo phase transition at a temperature above 40° C., whereas it is difficult for only the polishing heat to produce a temperature above 40° C. If the number of recurring units is too small, on the other hand, no phase transition is observable, or a portion other than the recurring unit of pentapeptide VPGVG becomes so significant that the desired phase transition attributable to the recurring unit of VPGVG may not take place. For example, a polymer containing in its molecular structure an oligopeptide consisting of 4 recurring units and having the molecular formula: (VPGVG)$_4$ analogous to elastin has a phase transition temperature of about 20° C. which can be reached by the polishing heat, and is also useful from the aspect of slurry flow.

Component (i) may be an oligopeptide consisting of recurring units of pentapeptide VPGVG or a copolymer of the pentapeptide with another monomer copolymerizable therewith. Suitable monomers include acrylic acid, methacrylic acid and N-isopropylacrylamide.

The structure of the copolymer (that is an oligopeptide/polymer combination) is preferably a block or graft copolymer rather than a random copolymer because the VPGVG chain should have temperature response. In the case of block copolymers, preference is given to diblock copolymers in which the polymer portion (constituting blocks other than the oligopeptide) has a molecular weight of 3,000 to 12,000. If the molecular weight of the polymer is too low, the synergy with oligopeptide may not be expectable. If the molecular weight of the polymer is too high, the polymer itself may exert too strong intermolecular interaction and become an obstruction to a structural change due to phase transition of oligopeptide.

In the case of graft copolymers, the grafting rate, that is, rate of oligopeptide grafted to the polymer is preferably 3 to 10%, more preferably 5 to 10%. Preferably, the polymer portion has a molecular weight of 3,000 to 12,000. If the grafting rate is too low, the temperature response effect of the oligopeptide incorporated as grafting chain may be insufficient. If the grafting rate is too high, the interaction within graft copolymer may become stronger, whereby the desired effect is diluted. Increasing the grafting rate is undesirable for the synthesis partly because of steric hindrance.

It is noted that the grafting rate is determined by analyzing a sample having a predetermined mass by proton-NMR spectroscopy, computing an integration ratio of peaks at 0.65 to 1.10 ppm attributable to proton on the grafting valine side chain, and computing according to the following equation.

Grafting rate=[(integration ratio of peaks attributable to the Val side chain of graft polymer)/(integration ratio of peaks attributable to the side chain of polymer prior to grafting=peaks attributable to functional moiety bondable with oligopeptide)]×100

The oligopeptide as component (i) may be prepared by the Fmoc solid phase synthesis or the like.

The oligopeptide or copolymer is preferably present in a concentration of 0.001 to 5% by weight, more preferably 0.01 to 2% by weight based on the solids of colloidal solution. If the concentration is too low, the polishing heat may not be fully absorbed, and particularly when a large amount of polishing heat is generated due to heavy polishing loads, no satisfactory effect may be obtained. If the concentration is too high, on the other hand, it is difficult to provide a consistent supply of the polishing slurry to the polishing tool because of the high viscosity of the oligopeptide or copolymer.

(ii) Colloidal Solution

The colloidal solution used herein contains colloidal particles having a reduced particle size as a main component, specifically a primary particle size of preferably 5 to 500 nm, more preferably 10 to 200 nm, and even more preferably 20 to 150 nm. Although a polishing slurry containing particles with an extremely small particle size is effective in polishing to a nano-order level, such small particles tend to attach or adhere to the substrate surface, interfering with subsequent substrate cleaning. A polishing slurry containing colloidal particles having an extremely large particle size may provide a substrate as polished with poor surface roughness and be often inconvenient for the final precision polishing. It is noted that the particle size is measured by the dynamic light scattering (DLS) method.

The concentration of colloid in the colloidal dispersion is preferably in a range of 20 to 50% by weight, more preferably 40 to 50% by weight. If the colloid concentration is lower than 20% by weight, the absolute amount of colloidal particles serving as abrasive grains in the polishing slurry is rather short, allowing the polishing pad to come in direct contact with the substrate. Then microscopic flaws or scratches are left on the glass surface due to the polishing pad. On the other hand, if the colloid concentration exceeds 50% by weight, too much colloidal particles in the slurry tend to agglomerate together, and so the polishing slurry becomes instable, causing flaws to the substrate surface. Also too high a concentration may correspond to a viscosity buildup which interferes with polishing.

For the colloidal particles, the particle size distribution may be either monodisperse or polydisperse, or multimodal. Types of the colloidal particles include colloidal silica, colloidal ceria, and colloidal zirconia. Of these, colloidal silica is preferred because it contains the same ingredients as synthetic quartz glass.

Colloidal silica may be prepared by a variety of methods, for example, granulation from water glass, or hydrolysis of organic silicates such as alkoxysilanes. The dispersing medium is often adjusted to alkaline pH values from the standpoint of shelf stability of colloidal silica, although it may have neutral or acidic pH. With the isoelectric point of colloidal silica taken into account, the dispersing medium is preferably at pH 3 to 5 or pH 8 to 11, more preferably pH 9 to 10.5. Near neutral pH, colloidal silica particles are weakly electrically charged, and the polishing slurry becomes unstable. At strong alkaline pH, the glass substrate as polished may have a rough surface.

On use, colloidal silica is typically dispersed in water. Silica may also be dispersed in organic solvents including alcohols such as ethanol and isopropyl alcohol, ketones such as acetone and methyl ethyl ketone, and aromatic compounds such as benzene, toluene and xylene. A mixture of such organic solvents is also acceptable. The organic solvent or organic solvent mixture may be mixed with water in any desired ratio as long as it is water soluble.

As the colloidal silica dispersion, commercially available products may be used, for example, COMPOL-50, COMPOL-80, COMPOL-120 and COMPOL-EX III from Fujimi Inc., ST-XL, ST-YL, and ST-ZL from Nissan Chemical Industries, Ltd., SYTON from Dupont, and GP series from Fuso Chemical Co., Ltd.

When a synthetic quartz glass substrate is polished using the polishing slurry, the addition of an elastin-analogous peptide, typically oligopeptide $(VPGVG)_4$ or copolymer thereof to the slurry ensures to minimize the number of defects, which can be detected by a high-sensitivity flaw detector, because the oligopeptide or copolymer absorbs the polishing heat generated by the polishing operation to prevent the slurry from concentrating.

If necessary, additives such as pH modifiers may be added to the polishing slurry. In particular, pH adjustment of the polishing slurry is important in controlling microscopic defects or scratches. It is thus desirable to add a pH modifier in order to keep the slurry in the range of pH 8 to 11, more preferably pH 9 to 10.5.

Suitable pH modifiers which can be used herein include alkali metal hydroxides, alkaline earth metal hydroxides, basic salts, organic amines, ammonia, and ammonium salts. Examples include potassium hydroxide, sodium hydroxide, calcium hydroxide, ammonium hydroxide, sodium borate, ammonium chloride, triethylamine, triethanolamine, diethanolamine, and ethylenediamine. These modifiers may be used alone or in combination of two or more. Preference is given to triethylamine capable of stabilizing the peptide and to diethanolamine and triethanolamine capable of forming chelate complexes with metal impurities such as aluminum ions for removal.

The pH modifier is preferably added to the polishing slurry in such an amount as to provide pH in the range of 8 to 11. Since it is important that the pH of the polishing slurry does not deviate from this range during polishing, late addition of the pH modifier is preferred. If the pH of the polishing slurry varies during polishing, the pH modifier may be added at an appropriate point of time so as to provide a pH value in the range. In the case of strong bases having a high dissociation constant like sodium hydroxide, pH adjustment is difficult because in the relevant pH range, even a small difference in addition amount may result in a substantial variation of pH. In this regard, amines which are bases of moderate strength, such as diethanolamine, triethanolamine and triethylamine are the preferred pH modifiers. Near neutral pH, colloidal silica tends to be unstable which is inconvenient to continuous polishing. At too high pH, surface roughening may occur on the polished quartz glass.

Additives other than the pH modifier which can be used herein include carboxylic acids and salts thereof. Specifically, carboxylic acids of chain structure and aromatic carboxylic acids may be used. Examples include malonic acid, succinic acid, maleic acid, fumaric acid, tartaric acid, malic acid, adipic acid, citric acid, benzoic acid, methylbenzoic acid, t-butylbenzoic acid, salicylic acid, phthalic acid, isophthalic acid, terephthalic acid, phenylacetic acid, and salts thereof. The additives exemplified above may be used alone or in combination of two or more. Since these molecules are bulky in aqueous solution and become an external factor to provide a steric hindrance to interaction of colloidal particles, they advantageously stabilize the polishing slurry by restraining fusion of colloidal particles. Typically the carboxylic acid or salt is added in an amount of 5 to 20% by weight.

According to the method of the invention, a synthetic quartz glass substrate is manufactured through rough polishing and final finish polishing steps. Specifically a synthetic quartz glass substrate is prepared from a synthetic quartz glass ingot by shaping, annealing, slicing, chamfering, lapping, and rough polishing to mirror finish. The rough polishing is followed by precision polishing by which the final surface quality of a synthetic quartz glass substrate is decided. The final polishing step uses the polishing slurry defined herein.

At this point, the polishing slurry is prepared at a temperature (typically 5 to 15° C.) below the phase transition temperature of the oligopeptide or copolymer by cooling with a suitable coolant. During polishing of glass substrate, the temperature of the polishing slurry is elevated to a level (typically 25 to 40° C.) beyond the phase transition temperature by the polishing heat. On phase transition, the oligopeptide or copolymer consumes the thermal energy available from the polishing heat. At the end of polishing, the polishing slurry is recovered and cooled again. On cooling, a phase transition inverse to the temperature elevation takes place. In this way, the polishing slurry can be reused in a semi-permanent manner.

It is noted that the polishing mode using the polishing slurry defined herein is typically batchwise double-side polishing although single-side polishing, single-substrate polishing or a combination thereof may also be acceptable.

The synthetic quartz glass substrate resulting from the inventive method may be used in the fields of semiconductor-related electronic materials, and especially in photomask, nanoimprint and magnetic disk applications.

EXAMPLE

Examples and Comparative Examples are given below for illustrating the invention, but the invention is not limited thereto.

Example 1

A synthetic quartz glass substrate stock as sliced (6 inches) was lapped and roughly polished, after which it was subjected to final finish polishing. A soft suede-type polishing pad was used. The polishing slurry used was a colloidal silica water dispersion having a $SiO_2$ concentration of 40% by weight (Fuso Chemical Co., Ltd., primary particle size 98 nm), to which 0.020% by weight (based on the solids of the silica dispersion) of an oligopeptide was added. The slurry was adjusted to pH 10.4 by adding diethanolamine and triethylamine. The oligopeptide, as prepared by the Fmoc solid phase synthesis method, consisted of 4 recurring units of VPGVG and had 20 amino acid residues and a molecular weight of 1,657. It was demonstrated by turbidity analysis that the oligopeptide (VPGVG)$_4$ assumed a spread molecular conformation at a temperature of 10° C. in the reservoir prior to supply to the polishing tool, and agglomerated at a temperature of 28° C. (which was measured as the polishing plate temperature of the polishing tool) during polishing.

Polishing was done under a pressure of 100 gf/cm$^2$ while the polishing allowance was an amount sufficient to remove the flaws introduced in the rough-polishing step (equal to or more than 2 μm).

At the end of polishing, the substrate was cleaned and dried. Defect inspection was carried out using a laser conforcal optical system high-sensitivity flaw detector (Lasertec Corp.). The number of defects having a size of 50 nm or greater was 1.5 on the average.

Comparative Example 1

The procedure of Example 1 was repeated under the same conditions except that no oligopeptide was added to the polishing slurry used in the final polishing. Upon similar defect inspection, the number of defects having a size of 50 nm or greater was 54 on the average.

Example 2

The procedure of Example 1 was repeated under the same conditions except that the additive was changed to 0.5% by weight of a graft polymer (VPGVG)$_4$-g-PAA which was obtained by grafting oligopeptide (VPGVG)$_4$ consisting of 4 recurring units of VPGVG and having 20 amino acid residues to side chains of polyacrylic acid (PAA) having a molecular weight of 10,000 in a grafting rate of 7%.

Upon similar defect inspection, the number of defects having a size of 50 nm or greater was 1.1 on the average.

Example 3

The procedure of Example 1 was repeated under the same conditions except that the additive was changed to 0.025% by weight of oligopeptide (VPGVG)$_8$ consisting of 8 recurring units of VPGVG and having 40 amino acid residues and a molecular weight of 3,296. The oligopeptide used herein was synthesized utilizing genetic engineering cell culture.

Upon similar defect inspection, the number of defects having a size of 50 nm or greater was 1.7 on the average.

Example 4

The procedure of Example 1 was repeated under the same conditions except that the additive was changed to 0.3% by weight of a diblock polymer (VPGVG)$_4$-b-PMAA, that is, a copolymer of oligopeptide (VPGVG)$_4$ consisting of 4 recurring units of VPGVG and having 20 amino acid residues and polymethacrylic acid (PMAA) having a molecular weight of 10,000. The diblock polymer (VPGVG)$_4$-b-PMAA was obtained by preparing the peptide portion by the Fmoc solid phase synthesis method and introducing PMAA therein by the ATRP method.

Upon similar defect inspection, the number of defects having a size of 50 nm or greater was 1.8 on the average.

Japanese Patent Application No. 2011-252633 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of manufacturing a synthetic quartz glass substrate through rough polishing and final polishing, comprising a final polishing step of polishing the synthetic quartz glass substrate, wherein the final polishing step uses a polishing slurry comprising
   (i) one of an oligopeptide comprising recurring units of pentapeptide: -[valine-proline-glycine-valine-glycine]- and a copolymer of such pentapeptide with other monomer copolymerizable therewith, wherein the oligopeptide or copolymer has a molecular weight of 800 to 150,000, and
   (ii) a colloidal solution,
   wherein the polishing slurry has a pH 9 to 11.

2. The method of claim 1 wherein the polishing slurry is kept at a temperature below the phase transition temperature of said oligopeptide or copolymer and then fed to the final polishing step so that said oligopeptide or copolymer may absorb the polishing heat of the final polishing step.

* * * * *